United States Patent Office 3,338,667
Patented Aug. 29, 1967

3,338,667
RECOVERY OF SILICA, IRON OXIDE AND MAGNESIUM CARBONATE FROM THE TREATMENT OF SERPENTINE WITH AMMONIUM BISULFATE
Frederick L. Pundsack, Somerville, N.J., assignor to Johns-Manville Corporation, New York, N.Y., a corporation of New York
No Drawing. Filed Dec. 2, 1963, Ser. No. 327,542
22 Claims. (Cl. 23—67)

This invention relates to a system of converting serpentine mineral into chemical products, and more particularly to an economical system or process of producing useful and valuable chemical agents from serpentine mineral wastes such as asbestos fines and low grade materials.

A major by-product or waste material in the production of chrysotile asbestos is the crushed and partially ground mother rock from which the fibrous asbestos has been separated and the fines or dust of asbestos too short for any practical applications. These materials, commonly termed "tailings" and "floats" in the industry, primarily comprise hydrated magnesium silicates of the serpentine family, and typically contain magnetite, brucite and minor quantities of other minerals including iron, chromium and nickel, normally to the extent of several percent by weight, as impurities. The quantities of such waste materials or products produced daily by a modern asbestos mill amounts to thousands of tons, and over the years considerable effort has been devoted to finding a practical use or uses for these waste materials.

It has long been known that strong mineral acids will attack or react with serpentine materials or materials yielding a relatively high surface area silica residue and a corresponding magnesium salt. As early as about 1934 Wolochow, in Canadian Letters Patent No. 340,901, proposed reacting concentrated sulfuric acid with serpentine mineral material to produce active silica. However, the use of strong mineral acid solutions to decompose serpentine is generally not an economical and in turn practical process. For example, in a sulfuric acid-serpentine decomposition reaction, slightly more than one pound of acid is required to produce about one-half pound of silica gel, and the by-product magnesia sulfate, which is contaminated with the iron normally present as an impurity in serpentine materials, is not an economically attractive product.

It is the primary object of this invention to provide an effective process or system which utilizes serpentine mineral material or wastes thereof and economically converts it to useful and valuable chemical agents or products.

It is a further object of this invention to provide a process or system of decomposing and/or converting serpentine materials into useful products or chemicals utilizing a relatively low cost acidic agent which can be economically and conveniently, repeatedly or continuously regenerated and recycled in the course of the process and reused.

It is a still further object of this invention to provide an effective system of converting waste serpentine material to valuable products which is substantially autogenous when the by-products thereof are recycled requiring only small quantities of make-up reagents and nominal heat requirements.

It is also an object of this invention to provide an effective and feasible means of economically producing products or chemicals of good purity from serpentine.

It is a more specific object of this invention to provide an economical and effective means of producing silica, iron oxide containing chromium and nickel values, and magnesium basic carbonate or magnesium oxide from serpentine materials.

These and other objects and advantages of this invention will be apparent from the following detailed disclosure and examples.

This invention in general comprises a novel system or combinations of cooperating and complementing chemical reactions or processes, the over-all or total effect of which comprises a substantially autogenous or self-sufficient system for the economical and efficient conversion of low cost waste serpentine materials into useful and valuable chemical agents and products. The invention may best be described by the equations illustrating and representing the principal or basic series of reactions comprising the system. These equations are exemplified as follows:

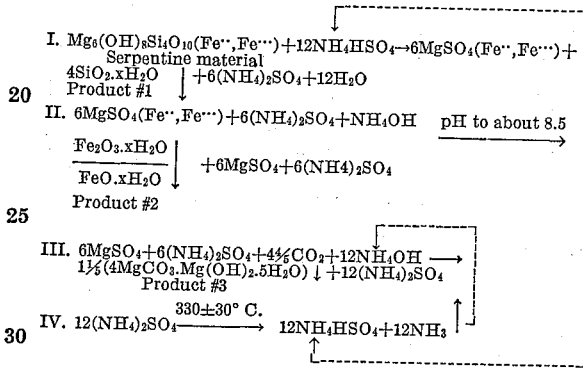

In the first step in the system of this invention illustrated by Equation I above, the serpentine material and ammonium bisulfate, a strongly acid salt, are combined in at least theoretical equivalents for the base present in the serpentine material (i.e., the magnesium content as magnesium hydroxide) or stoichiometric proportions, and preferably at least about 10% but for most effective reaction conditions with the ammonium bisulfate in about a 20 to 30% excess of stoichiometric proportions. In the preferred system, the wet process, which generally results in a more complete reaction, the serpentine material is admixed or slurried in an aqueous medium comprising the ammonium bisulfate salt. A particularly effective serpentine slurry concentration is about 5% thereof and at this concentration the optimum reacting proportions can be obtained by adding serpentine in amount to provide about 5% solids to an approximately 1.4 molar aqueous solution of the ammonium bisulfate salt. To increase the rate of the resulting reaction to a practical degree the slurry and/or solution of reactants should be heated to approximately boiling conditions and refluxed for approximately ½ to 6 hours or more. Thus treated the hydrated magnesia silicate serpentine material is rendered to an insoluble hydrated silica gel, magnesia sulfate, and ferric and/or ferrous sulfate from the iron typically present in serpentine materials, and the ammonium bisulfate reagent employed is converted to ammonium sulfate. The solids reaction product of this step essentially comprises the hydrated silica gel and this product (Product #1) is facilely removed from the reaction media by filtration.

The filtrate from Equation I, comprising primarily the remaining magnesium sulfate, ferric and/or ferrous sulfate, ammonium sulfate, and any excess of unreacted ammonium bisulfate reagent, is treated with ammonium hydroxide as is illustrated in Equation II, to increase the pH of the acidic reaction media to a level of at least approximately 8 or optimumly about 8.5 to precipitate the ferric and/or ferrous ions of the solution as hydrated iron oxides for separation by filtration (Product #2).

The filtrate from Equation II, comprising primarily magnesium sulfate, ammonium sulfate and any unreacted or excess ammonium bisulfate, as illustrated in Equation III, is then treated with a solution of ammonium hydroxide substantially saturated with or in conjunction with carbon dioxide. The ammonium hydroxide utilized in this step, for reasons of economy, preferably comprises a recycled by-product from a subsequent step or process of the system once the over-all system is initiated, and carbon dioxide for the same reasons may also be derived and recycled from a subsequent step, as will be apparent hereinafter. The introduction of ammonium hydroxide saturated or conjoined with carbon dioxide effects complex reactions having the net result of precipitating magnesium ions from the solution as magnesium basic carbonate which is recoverable from the solution by filtration (Product #3), and the ammonium hydroxide content of the solution is converted to ammonium sulfate.

The remaining reaction medium from Equation III primarily comprises ammonium sulfate which is recovered from the solution by evaporation at low heat so as to prevent decomposition, for example not in excess of about 210° F. The recovered, dried solid ammonium sulfate can be subsequently heated to about 330±30° C., preferably approximately 320° C., to form ammonium bisulfate and ammonia gas according to Equation IV for recycling and subsequent reuse in the primary reaction of cracking the serpentine material shown in Equation I.

As is apparent, the useful products of the foregoing system essentially comprise silica gel, hydrated iron oxide(s) frequently containing some chromium and nickel values, and magnesia basic carbonate or the magnesia and carbon dioxide components thereof. The properties of the silica gel product such as surface area, particle size and color depend upon the characteristics of the particular serpentine starting material. For instance, if the serpentine raw material is essentially mill tailings the silica gel product will be gray in color with a surface area of from approximately 100 to 250 square meters per gram, and a loose bulk density of about 5 to 10 p.c.f. If on the other hand serpentine floats are used as the raw material, the silica gel product will have a whiter color, a smaller particle size, and a higher surface area as for example up to approximately 400 square meters per gram. These latter properties increase its usefulness as a desiccant, a filler, and extender.

The iron oxide or oxides obtained from the foregoing system are poorly crystallized materials that normally contain from approximately 1 to 5% nickel and about 1% chromium as co-precipitated oxides. This mixed oxide product has applicability, among other possible uses, as an additive in steel making to form nickel-chrome alloy steels.

The magnesia basic carbonate product can be utilized as such, or ignited to produce magnesium oxide, carbon dioxide and water as shown in the equation:

$$\text{V. } 1\tfrac{1}{6}(4\text{MgCO}_3 \cdot \text{Mg(OH)}_2 \cdot 5\text{H}_2\text{O}) \xrightarrow{\text{heat}} 6\text{MgO} + 4\tfrac{2}{3}\text{CO}_2\uparrow + 6\text{H}_2\text{O}\uparrow.$$

If this step is utilized, the carbon dioxide is recoverable and can be recycled for application in the reaction of Equation III above.

An alternative method of carrying out the system of this invention is to dry mix the serpentine material with a substantial excess of ammonium sulfate of at least about 50% greater than stoichiometric proportions. The dry mixture of serpentine and ammonium sulfate is sufficiently wetted to enable it to be pelleted into relatively small briquettes or pellets which are then fired at a temperature of approximately 350±30° C. for periods of approximately 1 to 24 hours to effect the desired reaction. This reaction is illustrated below by Equation VI of the following set of equations. The resulting dry reaction mix is then slurried in water under acid conditions as shown below in Equation VII, and the soluble magnesium and iron salts produced dissolve away from the residual silica. The silica residue is filtered off and recovered, and the filtrate is treated as shown in Equations VIII and IX. These latter steps are analogous to Equations II and III in the wet process described hereinabove. This alternative or dry process system is illustrated by the following equations:

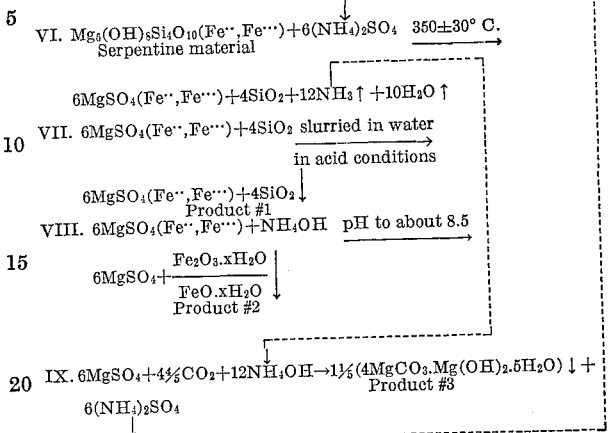

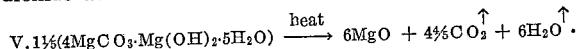

As shown in the equations, the ammonium sulfate produced in the reaction of Equation IX and the ammonia resulting from the reaction of Equation VI, for reasons of economy, are recovered and recycled for use in the reactions of Equation VI and Equation IX, respectively.

The temperatures employed in Equation VI are critical in that too high temperatures, e.g., in excess of about 390° C., thermally degrade the ammonia salt completely and at temperatures appreciably below about 325° C. the rate of the reaction is too slow to be practical. The overall range of temperatures for the thermal decomposition of the ammonium sulfate to produce ammonium bisulfate and ammonia gas as in Equation IV and Equation VI for reaction with the serpentine material is from about 300° to about 380° C. with approximately 300° to 360° C. optimum for the preferred wet process and approximately 320° to 380° C. optimum, preferably 375° C., for the dry process.

It has been found that in general the wet process effects a more complete reaction of the serpentine material than the dry process, and on this basis the wet process is preferred.

The following comprise specific illustrations or examples of preferred and typical means of practicing this invention and of demonstrating the effectiveness thereof. It should be understood that the conditions and the materials and their source(s) and/or proportion(s) given and the techniques specified are merely exemplary and are not to be construed as limiting the invention to any particular data recited.

This example comprises an illustration of a typical means of carrying out the preferred wet process or system of this invention.

*Example I*

Ammonium bisulfate reagent for use in the serpentine cracking reaction step illustrated by Equation I of the system of this invention was prepared by the thermal decomposition of ammonium sulfate according to Equation IV. This step, for reasons of convenience, was carried out with two separate batches of ammonium sulfate, each weighing initially 1500 grams. Batch No. 1 was heated 18 hours at 317±2° C. but as this temperature did not produce complete fluidity of the mass it was subsequently increased to 322±2° C. for 8 hours and complete fluidity resulted. Weight loss of Batch No. 1, due primarily to the evolution of ammonia gas, was 14.3% as compared to a theoretical loss of 12.9%. Batch No. 2 was heated 21½ hours at 324±2° C. with complete fluidity being achieved and the resulting weight loss was 13.5%. The two batches of ammonium bisulfate resulting from the thermal decomposition of ammonium sulfate were combined with a total resultant weight of 2551 grams, and this was dissolved in approximately 16 liters of hot (95° C.) water. In theory this would give about a 1.4 normal $NH_4HSO_4$ solution.

A series of samples of the initial ammonium bisulfate reagent and of the reaction medium of ammonium bisulfate and serpentine material were taken periodically throughout the serpentine cracking process or reaction of Equation I to evaluate the effectiveness and degree of completion of this primary and basic step of the system. Sample No. 1 was taken at this point, or in other words Sample No. 1 consisted of a specimen of the initial ammonium bisulfate solution. The remaining ammonium bisulfate solution, estimated at about 15.8 liters, was stirred while 800 grams of 7T grade chrysotile asbestos floats were added (if the asbestos floats comprised only pure serpentine this amount would be equivalent to adding 17.33 equivalents of base). The solution of ammonium bisulfate and asbestos floats was continuously stirred and maintained at a temperature of 90° to 98° C. Aliquot samples of the reaction mixture were taken approximately every hour and after 5 hours the heat was turned off and the mixture cooled for 1½ hours. The cooled solution was filtered and the filter cake therefrom (Product #1) collected.

The aliquot samples collected throughout the reaction were titrated in 2 ml. portions with 0.1009 normal NaOH and the titration data indictaed a relatively complete reaction within a matter of hours. These data are:

The resulting filter cake was dried at 150° C. and designated "S1." The dry weight of Sample "S1" was 233.7 grams or 29.2% of the original serpentine sample. The residue left when the 2100 ml. of supernatant was siphoned off was resuspended, stirred, filtered, washed and dried at 150° C. This fraction of the insoluble material, designated "S2," was darker in color and coarser grained than the "S1" fraction and weighed 85.7 grams or 10.7% of the original serpentine sample. The "S1" material had a nitrogen surface area of 358 square meters per gram, and a sample thereof upon drying 3 hours at 150° C. exhibited water adsorption characteristics upon exposure to a 45% relative humidity of 10.8% weight increase after 1 hour, 12.1% increase after 2½ hours, and 13.4% after 12 hours.

The filtrates collected from the foregoing initial step of cracking the serpentine and removing insoluble hydrated silica and the acid insoluble magnetite material (Equation I), were combined and stirred while concentrated ammonium hydroxide was slowly added. As the pH rose a reddish precipitate formed and when the pH approached 7 the precipitate began to darken, presumably due to the formation of ferric hydroxide, cobalt hydroxide, and nickel hydroxide. When the pH reached a value of 8.6 the solution comprising the precipitate was permitted to settle and it was then filtered out. The precipitate of hydrated metal (Product #2) was dried overnight at 150° C. and weighed at 70.4 grams. The granular particles were broken up with a mortar and pestle and sus-

TABLE

| Sample | Time, hr. | Milliequivalents of Base | Milliequivalents of Acid in 2 ml. Aliquot | Equivalents of Acid Left in Reaction Mix | Equivalents of Acid Reacted With Floats | Percent Completion of Theoretical Reaction (Based on 17.33 Equivalents of Base) |
|---|---|---|---|---|---|---|
| 1 | 0 | 23.86 | 2.408 | 19.00 | 0 | 0 |
| 2 | 1 | 5.67 | 0.572 | 4.58 | 14.42 | 83.2 |
| 3 | 2 | 4.73 | 0.477 | 3.82 | 15.18 | 87.6 |
| 4 | 3.2 | 4.10 | 0.414 | 3.31 | 15.69 | 90.6 |
| 5 | 5 | 3.62 | 0.365 | 2.92 | 16.08 | 92.8 |

Titration of the initial solution indicated the presence of 19 equivalents of acid as compared with a theoretical value of 22.2 equivalents, based upon the assumption that the entire 2551 grams of ammonium sulfate thermal reaction product was $NH_4HSO_4$. The heat treatment of the ammonium sulfate obviously was not 100% effective in the conversion to ammonium bisulfate due, for example, to incompleteness of the reaction and/or decomposition of the converted material among other possible occurrences. Nevertheless, the actual reaction solution or medium contained about a 10% excess of acid over the theoretical base equivalents of the serpentine material present. It is noteworthy that even at such a relatively low acid excess concentration, the reaction was rapid and effective in approaching its theoretical end point in achieving a 92.8% completion in 5 hours.

The foregoing collected and retained filter cake (Product #1) comprising the insoluble precipitate formed pursuant to the above ammonium bisulfate decomposition of serpentine material was stirred into 2500 ml. of a 3% sulfuric acid solution and this mixture was agitated in suitable volume proportions in a Waring Blendor for about 2 minutes per batch and then each recombined. The combined solution was stirred and "fished" with a magnet to collect and recover magnetite. The collected magnetite was then washed, filtered and dried at 150° C. and the amount thereof recovered weighed 13.0 grams or about 1.6% of the original 800 grams serpentine sample. Next, the resuspended filter cake or slurry thereof was permitted to settle for about 10 minutes, then the top 2100 ml. of suspension was siphoned off and filtered.

pended in 500 ml. of water to wash out any occluded salts. This suspension was filtered out on a Büchner funnel, washed several times in situ, and dried at 150° C. The dry weight thereof of 67.2 grams comprised 8.4% of the original serpentine containing charge. This product was comprised primarily of hydrated iron oxides with traces of oxides of nickel and chromium.

The clear blue filtrate remaining from the previous precipitation (Equation II) was treated according to Equation III by adding ammonium hydroxide and carbon dioxide, the latter being bubbled through the solution. A white milky precipitate began to form as the pH initially increased to a value of about 9 or slightly more, but upon increasing the rate of addition of carbon dioxide and stirring the pH dropped and remained at about 8.65. The addition of the reagent was stopped and after standing about 45 minutes the suspension was filtered and the cake washed repeatedly in situ. The precipitate (Product #3) was vacuum oven dried at approximately 105° to 110° C. An ignition of the magnesium basic carbonate precipitate (Equation V) gave an MgO content of 43.7%. To determine the effectiveness of the reaction the amount of MgO still in solution was evaluated by precipitating out an aliquot sample any remaining MgO as $Mg(OH)_2$ employing NaOH as a precipitating agent. This test indicates that the separation of magnesium oxide from solution in the form of basic carbonate is relatively effective with the carbonate precipitate recovering 95.7% of the soluble magnesium oxide.

The following example comprises an illustration of the dry process for the practice of this invention.

Example II

Fifteen hundred grams of chrysotile asbestos floats, grade 7T, were mixed with 3250 grams, or a 1.5 excess of chemical equivalents, of ammonium sulfate. This mixture was milled with about 6% by weight thereof of water and briquetted into pillow shaped pellets measuring about 2 in. x 2 in. x approximately 1 in. at their centers and with an average weight of about 6.7 grams per pellet. A charge of 2490 grams of the pelleted mixture of serpentine material and ammonium sulfate in a Pyrex baking dish was placed in a Lindbergh furnace at 375° C., according to Equation VI. After 17 hours the charge was removed from the furnace and as a matter of convenience divided into two batches of approximately equal proportions for subsequent handling. Batch No. 1, weighing 959.4 grams, and Batch No. 2, weighing 1008.8 grams, were each stirred into 2500 ml. volumes of water as in Equation VII, stirred vigorously and heated to about 80° to 90° C. for about 1½ hours. The respective solutions thus formed were filtered and the recovered precipitated solids (Product #1) were combined and the filtrates were also combined.

The solids comprising the recovered silica from Equation VI were resuspended in about 2500 ml. of 2% sulfuric acid, stirred vigorously and again filtered. The solid filter cake produced from this filtration was removed intact from the Büchner funnel and the bottom of the cake, which contained a large proportion of sand and large particle size grit, was scraped away and dried at 150° C. This fraction had a weight of 63.1 grams. The remaining major portion of the cake was resuspended in about 2000 ml. of 2% sulfuric acid, treated in a Waring Blendor for about 1 minute, then while being stirred "fished" for magnetite with a magnet. The magnetite collected in this manner comprised perhaps a total of a gram and was washed down the drain. Next, the slurry was filtered and the precipitate recovered washed repeatedly, then the cake dried at 145° C. overnight whereupon it weighed 296.4 grams. Based on the assumption that the initial charge of 2490 grams contained about 5% by weight of water, and that 31.6% of the solids were floats, the weight of the asbestos in the charge was about 750 grams, thus the dried filter cake represents 39.5% of the original charge of floats. Including the 63.1 grams of material that was scraped off earlier, the total solids recovery from the reaction mixture was 359.5 grams or 48% of the weight of the original floats.

The combined filtrates from the reaction of Equation VII was treated with ammonia hydroxide until the pH was increased to about 8.5 as shown in Equation VIII whereupon the hydrated iron oxides, etc. precipitated out (Product #2). The solids were removed by filtration, resuspended in about 2000 ml. of water, stirred vigorously and filtered again. The cake was dried at 150° C. and the dry weight was 92 grams, or 12.3% of the weight of the asbestos floats in the original charge.

The filtrate resulting from the removal of the iron oxides (Equation VIII) and comprising primarily the magnesium fraction as a sulfate was then treated with ammonium hydroxide and carbon dioxide as in Equation III of Example I to precipitate the magnesium content out of solution as magnesium basic carbonate.

As is fully apparent from the foregoing disclosure and examples, the novel system or combination of reactions of this new process are so interrelated as to cooperatively coact to provide for the economical and effective production of useful materials or chemicals from waste material. A particularly significant and cost reducing feature of this new process is that it carried out as a substantially autogenous or closed system through the recovery and reutilization of all chemical by-products which in turn meet substantially all reagent needs. The recovered and recycled materials must of course include some make up material to compensate for attrition or normal operating loss. However, with proper design and controls the net make-up of reagents and the heat requirements to sustain the mechanism of the system are nominal.

It should be understood that the foregoing details are given for purposes of illustration, not restriction, and that variations within the spirit of this invention are intended to be included within the scope of the appended claims.

I claim:
1. The method for producing useful products from serpentine mineral consisting of a combination of reactions comprising the steps of:
   (a) reacting serpentine mineral with ammonium bisulfate at a temperature sufficient to decompose said mineral and thereby producing silica, magnesium sulfate and ammonium sulfate, and recovering from the system the silica solids;
   (b) treating an aqueous solution of the remaining reaction products of step (a) comprising magnesium sulfate and ammonium sulfate, with ammonium hydroxide to increase the pH thereof to at least about 8 and thereby precipitate out any ferric and ferrous ions present as hydrated iron oxides and recovering the same;
   (c) adding ammonium hydroxide and carbon dioxide to the solution of magnesium sulfate and ammonium sulfate of step (b) and thereby precipitating out the magnesium ions as magnesium basic carbonate, and converting the ammonium hydroxide to ammonium sulfate;
   (d) recovering ammonium sulfate from the aqueous solution of step (c) by evaporation and thermally decomposing the ammonium sulfate producing ammonium bisulfate for recycling and use in step (a) and ammonia for recycling and use as ammonium hydroxide.
2. The method for producing useful products of serpentine mineral consisting of a combination of reactions comprising the steps of:
   (a) reacting serpentine mineral with ammonium bisulfate in amount of at least stoichiometric proportions at a temperature sufficient to decompose said mineral producing silica, magnesium sulfate and ammonium sulfate, and recovering from the system hydrated silica solids;
   (b) adding ammonium hydroxide to an aqueous solution of reaction products from step (a) comprising magnesium sulfate, ammonium sulfate, and ferric and ferrous ions to increase the pH thereof to about 8.5, precipitating out the ferric and ferrous ions present as hydrated iron oxides, and recovering the same;
   (c) adding ammonium hydroxide solution together with carbon dioxide to the solution of magnesium sulfate and ammonium sulfate from step (b), precipitating the magnesium ion as magnesium basic carbonate, and converting the added ammonium hydroxide to ammonium sulfate;
   (d) recovering the ammonium sulfate from the aqueous solution from step (c) by evaporation and thermally decomposing the ammonium sulfate thereof by heating the same to about 340±40° C., producing ammonium bisulfate for recycling and use in step (a) and ammonia for recycling and use as ammonium hydroxide.
3. The method of claim 2, wherein the basic magnesium carbonate recovered in step (c) is ignited producing magnesium oxide, carbon dioxide and water.
4. The method of claim 3, wherein the carbon dioxide is recovered and recycled for use with the ammonium hydroxide solution employed in step (c) of claim 2.
5. The method of producing useful products from serpentine mineral consisting of a combination of reactions comprising the steps of:
   (a) reacting the serpentine mineral with ammonium bisulfate in amounts of at least about 10% in excess of stoichiometric proportions of ammonium bisulfate per mol of serpentine at a temperature sufficient to decompose said mineral thereby producing silica, magnesium sulfate and ammonium sulfate, and recovering from the system the hydrated silica solids;

(b) adding ammonium hydroxide to an aqueous solution of the reaction products of step (a) comprising magnesium sulfate, ammonium sulfate, and ferric and ferrous ions to increase the pH thereof to about 8.5 and precipitating out the ferric and ferrous ions as hydrated iron oxides, and recovering the same;

(c) adding ammonium hydroxide solution saturated with carbon dioxide to the solution of magnesium sulfate and ammonium sulfate from step (b), precipitating the magnesium ions as magnesium basic carbonate and converting the added ammonium hydroxide to ammonium sulfate;

(d) recovering ammonium sulfate from the aqueous solution of step (c) by evaporation and thermally decomposing the ammonium sulfate by heating the same at about 340±40° C. producing ammonium bisulfate for recycling and use in step (a), and ammonia for recycling and use as ammonium hydroxide in the system.

6. The method of claim 5, wherein the basic magnesium carbonate recovered in step (c) thereof is ignited producing magnesium oxide, carbon dioxide and water.

7. The method of claim 6, wherein the carbon dioxide is recovered and recycled for saturation of the ammonium hydroxide solution for use in step (c) of claim 5.

8. The method of producing useful products from serpentine mineral consisting of a combination of reactions comprising the steps of:

(a) reacting the serpentine mineral with ammonium bisulfate at a temperature sufficient to decompose said mineral producing silica, magnesium sulfate and ammonium sulfate, recovering from the system silica according to the reaction—

$$Mg_6(OH)_8Si_4O_{10}(Fe^{..}, F^{...}) + 12 NH_4HSO_4 \longrightarrow$$
Serpentine material
$$6MgSO_4(Fe^{..}, Fe^{...}) + 4SiO_2.xH_2O \downarrow + 6(NH_4)_2SO_4 + 12H_2O$$

(b) treating an aqueous solution of reaction products of step (a) comprising magnesium sulfate, ammonium sulfate, and ferric and ferrous ions with ammonium hydroxide increasing the pH thereof to about 8.5 and precipitating out the ferric and ferrous ions as hydrated iron oxides, and recovering the same according to the reaction—

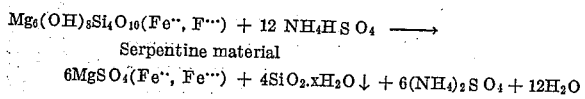

$$6MgSO_4(Fe^{..}, Fe^{...}) + 6(NH_4)_2SO_4 + NH_4OH \xrightarrow{\text{pH to about 8.5}}$$
$$\frac{Fe_2O_3.xH_2O}{FeO.xH_2O} \downarrow + 6MgSO_4 + 6(NH_4)_2SO_4$$

(c) adding ammonium hydroxide and carbon dioxide to the solution of magnesium sulfate and ammonium sulfate of step (b), precipitating the magnesium ions as magnesium basic carbonate and converting the ammonium hydroxide to ammonium sulfate according to the reaction—

$$6MgSO_4 + 6(NH_4)_2SO_4 + 4\tfrac{2}{3}CO_2 + 12NH_4OH \longrightarrow$$
$$1\tfrac{1}{6}(4MgCO_3.Mg(OH)_2.5H_2O) \downarrow + 12(NH_4)_2SO_4$$

(d) recovering the ammonium sulfate from the aqueous solution of step (c) by evaporation and thermally decomposing the ammonium sulfate producing ammonium bisulfate for recycling and use in step (a) and ammonia for recycling and use as ammonium hydroxide in the process according to the reaction—

$$12(NH_4)_2SO_4 \xrightarrow{340 \pm 40° C.} 12NH_4HSO_4 + 12NH_3 \uparrow$$

9. The method of claim 8, wherein the basic magnesium carbonate recovered in step (c) thereof is ignited producing magnesium oxide, carbon dioxide and water, according to the reaction $$1\tfrac{1}{6}(4MgCO_3.Mg(OH)_2.5H_2O) \xrightarrow{heat} 6MgO + 4\tfrac{2}{3}CO_2 \uparrow + 6H_2O \uparrow$$

10. The method of claim 9, wherein the carbon dioxide is recovered and recycled for use in (c) of claim 8.

11. The method of producing useful products from serpentine mineral consisting of a combination of reactions comprising the steps of:

(a) reacting a slurry of serpentine mineral solids with an aqueous solution of ammonium bisulfate producing a solution comprising hydrated silica solids, ferric and ferrous ions, magnesium sulfate, and ammonium sulfate, and recovering the hydrated silica solids from the system;

(b) treating the solution of reaction products of step (a) comprising ferric and ferrous ions, magnesium sulfate, and ammonium sulfate, increasing the pH thereof to at least about 8 and precipitating the ferric and ferrous ions out of the solution as hydrated iron oxides and recovering the same from the system;

(c) adding ammonium hydroxide and carbon dioxide to the solution comprising magnesium sulfate and ammonium sulfate from step (b), precipitating the magnesium ions as magnesium basic carbonate and recovering the same from the system, and converting the added ammonium hydroxide to ammonium sulfate;

(d) recovering the ammonium sulfate from the solution from step (c) by evaporation and thermally decomposing the ammonium sulfate solids producing ammonium bisulfate and recycling the same for use in step (a), and producing ammonia for conversion to ammonia hydroxide and recycling for subsequent use in the system.

12. The method of claim 11, wherein the basic magnesium carbonate which is recovered in step (c) thereof is ignited producing magnesium oxide, carbon dioxide and water.

13. The method of claim 12, wherein the carbon dioxide is recovered and recycled for use with the ammonium hydroxide in step (c) of claim 11.

14. The method of producing useful products of serpentine mineral consisting of a combination of reactions comprising the steps of:

(a) reacting an aqueous medium comprising a slurry of approximately 5% solids of serpentine mineral with at least about 20% excess of stoichiometric proportions of ammonium bisulfate by refluxing for approximately one-half to twelve hours producing a solution comprising hydrated silica gel solids, ferric and ferrous ions, magnesium sulfate, and ammonium sulfate, recovering the hydrated silica gel solids from the system;

(b) adding ammonium hydroxide to the aqueous solution comprising ferric and ferrous ions, magnesium sulfate, and ammonium sulfate of step (a), increasing the pH thereof to about 8.5 and thereby precipitating the ferric and ferrous ions out of the solution as hydrated iron oxides and recovering the same from the system;

(c) adding a solution of ammonium hydroxide saturated with carbon dioxide to the aqueous solution of step (b) comprising magnesium sulfate and ammonium sulfate, precipitating the magnesium ions as magnesium basic carbonate, recovering the same from the system, and converting the added ammonium hydroxide to ammonium sulfate;

(d) recovering the ammonium sulfate from the aqueous solution of step (c) by evaporation and thermally decomposing the ammonium sulfate thus recovered by heating to about 330±30° C. producing ammonium bisulfate for recycling and use in step (a) and producing ammonia which is converted to ammonium hydroxide and recycled for use in step (c).

15. The method of claim 14, wherein the basic magnesium carbonate recovered in step (c) thereof is ignited producing magnesium oxide, carbon dioxide and water.

16. The method of claim 15, wherein the carbon dioxide is recovered and recycled for use in step (c) of claim 14.

17. The method of producing useful products from serpentine mineral consisting of a combination of reactions comprising the steps of:
(a) combining particulate serpentine mineral with ammonium sulfate in amounts of at least about 25% of ammonium sulfate in excess of stoichiometric proportions, wetting and pelleting the mixture, firing the serpentine and ammonium sulfate pellets at temperatures of about $350 \pm 30°$ C., effecting the thermal decomposition of the ammonium sulfate to ammonium bisulfate and reacting the resulting ammonium bisulfate with the serpentine material producing silica, magnesium sulfate, ferric and ferrous sulfate, ammonia, and water;
(b) dispersing the reaction products of step (a) comprising silica, magnesium sulfate and ferric and ferrous sulfate in an aqueous media dissolving the magnesium sulfate and ferric and ferrous sulfates, and recovering the insoluble silica residue;
(c) treating the aqueous solution of step (b) comprising magnesium sulfate and ferric and ferrous sulfate to increase the pH thereof to at least about 8, precipitating out the ferric and ferrous ions as hydrated iron oxides, and recovering the same;
(d) adding ammonium hydroxide and carbon dioxide to the solution of magnesium sulfate of step (c), precipitating the magnesium ion as magnesium basic carbonate and converting the added ammonium hydroxide to ammonium sulfate, and recovering the precipitated magnesium basic carbonate;
(e) recovering from the solution of step (d) the ammonium sulfate and recycling the same for use in step (a).

18. The method of claim 17, wherein the magnesium basic carbonate recovered in step (d) is ignited producing magnesium oxide, carbon dioxide and water.

19. The method of claim 18, wherein the carbon dioxide is recovered and recycled for use in step (d) of claim 17.

20. The method of producing useful products of serpentine mineral consisting of a combination of reactions comprising the steps of:
(a) combining finely divided serpentine minerals with ammonium sulfate in amount of approximately 50% of ammonium sulfate in excess of stoichiometric proportions, wetting and pelleting the mixture, firing the serpentine and ammonium sulfate pellets at approximately 375° C. to effect the thermal decomposition of the ammonium sulfate to ammonium bisulfate and reacting the resulting ammonium bisulfate with the serpentine material producing anhydrous silica, magnesium sulfate, ferric and ferrous sulfate, ammonia and water;
(b) dispersing the solid reaction products of step (a) comprising silica, magnesium sulfate and ferric and ferrous sulfate in an aqueous media dissolving the magnesium sulfate and ferric and ferrous sulfate, and recovering the insoluble silica residue;
(c) treating the aqueous solution of step (b) comprising magnesium sulfate, ferric and ferrous sulfate with ammonium hydroxide increasing the pH of the solution to about 8.5 and thereby precipitating out the ferric and ferrous ions as hydrated iron oxides, and recovering the same;
(d) adding ammonium hydroxide saturated with carbon dioxide to the solution of magnesium sulfate of step (c), precipitating the magnesium ions as magnesium basic carbonate and converting the ammonium hydroxide content of the solution to ammonium sulfate, and recovering the precipitated magnesium basic carbonate;
(e) recovering by evaporation from the solution of step (d) the ammonium sulfate, and recycling the same for use in step (a).

21. The method of claim 20, wherein the magnesium basic carbonate recovered in step (d) is ignited producing magnesium oxide, carbon dioxide and water.

22. The method of claim 21, wherein the carbon dioxide is recovered and recycled for saturation of the ammonium hydroxide solution in step (b) of claim 20.

References Cited

UNITED STATES PATENTS

| | | | |
|---|---|---|---|
| 1,231,423 | 6/1917 | Peacock | 23—201 |
| 1,321,424 | 11/1919 | Elliott | 23—67 |
| 1,348,933 | 8/1920 | Dolbear | 23—301 |
| 1,988,524 | 1/1935 | Stump | 23—201 X |
| 2,070,497 | 2/1937 | Sweet et al. | 23—67 |
| 2,402,370 | 6/1946 | Chalmers | 23—182 X |
| 2,700,004 | 1/1955 | Miller | 23—119 X |
| 2,721,796 | 10/1955 | McGauley | 23—119 X |
| 2,767,046 | 10/1956 | Piros | 23—119 X |
| 2,838,373 | 6/1958 | Stricker | 23—119 |
| 3,017,243 | 1/1962 | Archambault et al. | 23—32 X |

OSCAR R. VERTIZ, *Primary Examiner.*

G. T. OZAKI, *Assistant Examiner.*

UNITED STATES PATENT OFFICE
CERTIFICATE OF CORRECTION

Patent No. 3,338,667                                             August 29, 1967

Frederick L. Pundsack

It is hereby certified that error appears in the above numbered patent requiring correction and that the said Letters Patent should read as corrected below.

Column 2, last line of the equation for $12NH_4HSO_4+NH_3$ read $12NH_4HSO_4+12NH_3$; column 5, line 28, for "indictaed" read -- indicated --; column 9, line 37, for "according to the reaction" read -- solids according to the reaction --; line 58, for "magniesium" read -- magnesium --; column 10, line 66, for "carbonate," read -- carbonate --.

Signed and sealed this 15th day of April 1969.

(SEAL)
Attest:

Edward M. Fletcher, Jr.                                EDWARD J. BRENNER
Attesting Officer                                                Commissioner of Patents